US007854025B2

(12) United States Patent
Spinelli

(10) Patent No.: US 7,854,025 B2
(45) Date of Patent: Dec. 21, 2010

(54) PROTECTIVE AND DECORATIVE COVERING FOR SPORTS HELMETS

(75) Inventor: Thomas Spinelli, East Northport, NY (US)

(73) Assignee: Omnitek Partners LLC, Bayshore, NY (US)

( * ) Notice: Subject to any disclaimer, the term of this patent is extended or adjusted under 35 U.S.C. 154(b) by 969 days.

(21) Appl. No.: 11/004,254

(22) Filed: Dec. 3, 2004

(65) Prior Publication Data

US 2006/0117463 A1 Jun. 8, 2006

(51) Int. Cl.

| | |
|---|---|
| ***A63B 71/10*** | (2006.01) |
| ***A42B 1/06*** | (2006.01) |
| ***B65D 65/00*** | (2006.01) |
| ***B29C 65/00*** | (2006.01) |
| ***B32B 37/00*** | (2006.01) |

(52) U.S. Cl. ............................... 2/425; 2/410; 206/497; 156/84; 156/86

(58) Field of Classification Search ..................... 2/410, 2/425, 422, 244, 246, 6.1, 6.6; 40/329; 150/154; 206/457, 497, 0.5, 315.1, 315.9, 315.91; 439/932

See application file for complete search history.

(56) References Cited

U.S. PATENT DOCUMENTS

| | | | | |
|---|---|---|---|---|
| 2,143,483 | A * | 1/1939 | Iglauer | 2/411 |
| 2,582,982 | A * | 1/1952 | Gammeter | 206/205 |
| 2,850,740 | A * | 9/1958 | Adams | 2/9 |
| 3,172,667 | A * | 3/1965 | Baker et al. | 473/330 |
| 3,182,658 | A * | 5/1965 | Klinger | 128/201.12 |
| 3,245,087 | A * | 4/1966 | Marchello | 2/422 |
| 3,329,143 | A * | 7/1967 | Gordon | 602/3 |
| 3,445,860 | A * | 5/1969 | Rodell | 2/422 |
| 3,479,666 | A * | 11/1969 | Webb | 2/6.6 |
| 3,542,229 | A * | 11/1970 | Merz et al. | 215/12.2 |
| 3,634,954 | A * | 1/1972 | Larsen et al. | 36/7.3 |
| 3,694,939 | A * | 10/1972 | Chen | 36/7.3 |
| 3,829,348 | A * | 8/1974 | Spiegel et al. | 428/11 |
| 3,984,005 | A * | 10/1976 | Amberg | 215/230 |
| 4,644,630 | A * | 2/1987 | Blum | 29/453 |
| 4,795,031 | A * | 1/1989 | Voss et al. | 206/315.9 |
| 4,815,603 | A * | 3/1989 | Harris | 206/497 |
| 4,941,572 | A * | 7/1990 | Harris | 206/423 |
| 4,993,082 | A * | 2/1991 | Gentes et al. | 2/410 |
| 5,265,727 | A * | 11/1993 | Anderson | 206/457 |
| 5,525,290 | A * | 6/1996 | Carpenter | 264/510 |
| 5,558,326 | A * | 9/1996 | Adamson et al. | 473/563 |
| 5,639,529 | A * | 6/1997 | Gozdecki et al. | 428/40.1 |

(Continued)

FOREIGN PATENT DOCUMENTS

DE 3619282 A1 * 12/1987

(Continued)

OTHER PUBLICATIONS

Houghton Mifflin Company, The American Heritage Dictionary, 1982, Second College Edition, p. 923.*

*Primary Examiner*—Gary L Welch
*Assistant Examiner*—Jane S Yoon

(57) ABSTRACT

A covering for a sports helmet is provided. The covering including a band having at least a portion composed of a first heat shrink material. The band being sized to cover the sports helmet after an application of heat to the first heat shrink material. Also provided is a sports helmet.

19 Claims, 5 Drawing Sheets

U.S. PATENT DOCUMENTS

| | | | | | |
|---|---|---|---|---|---|
| 5,732,414 | A | * | 3/1998 | Monica | 2/425 |
| 5,833,796 | A | * | 11/1998 | Matich | 156/285 |
| 5,943,702 | A | * | 8/1999 | Kronenberger | 2/171.1 |
| 5,962,368 | A | * | 10/1999 | Poole | 503/227 |
| 5,976,296 | A | * | 11/1999 | Sherman et al. | 156/230 |
| 6,061,836 | A | * | 5/2000 | Peters | 2/175.6 |
| 6,797,218 | B1 | * | 9/2004 | Bickerstaff | 264/230 |
| 7,172,065 | B2 | * | 2/2007 | Prater | 206/0.5 |
| 2001/0013347 | A1 | * | 8/2001 | Rekow et al. | 128/205.27 |
| 2001/0043469 | A1 | * | 11/2001 | Carpenter et al. | 362/161 |
| 2002/0103034 | A1 | * | 8/2002 | Kammerer et al. | 473/54 |
| 2002/0112448 | A1 | * | 8/2002 | Fisher | 53/411 |
| 2003/0203166 | A1 | * | 10/2003 | Dronzek | 428/195.1 |
| 2004/0040066 | A1 | * | 3/2004 | Hardenbrook | 2/171 |
| 2004/0045206 | A1 | * | 3/2004 | Witham | 40/642.02 |
| 2006/0076101 | A1 | * | 4/2006 | Krivich | 156/86 |

FOREIGN PATENT DOCUMENTS

| | | | | |
|---|---|---|---|---|
| EP | 668030 | A1 | * | 8/1995 |
| FR | 2680305 | A1 | * | 2/1993 |
| GB | 2018138 | A | * | 10/1979 |
| GB | 2103468 | A | * | 2/1983 |
| JP | 06158412 | A | * | 6/1994 |
| JP | 2003245387 | A | * | 9/2003 |

* cited by examiner

FIG. 6A
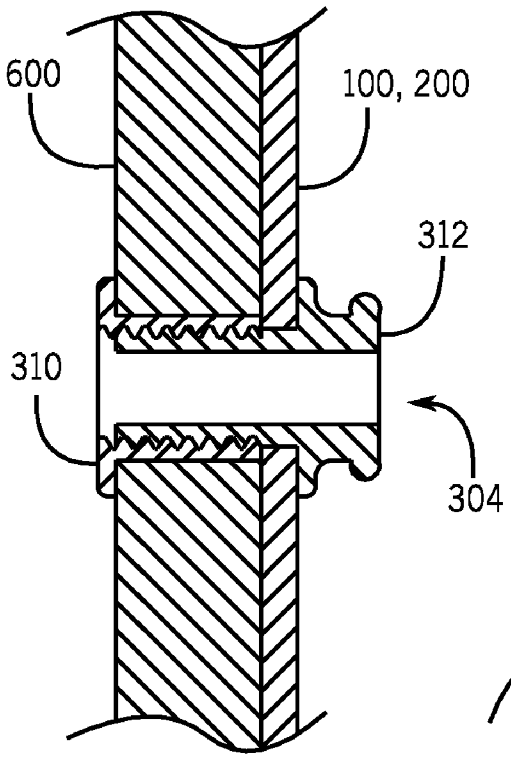
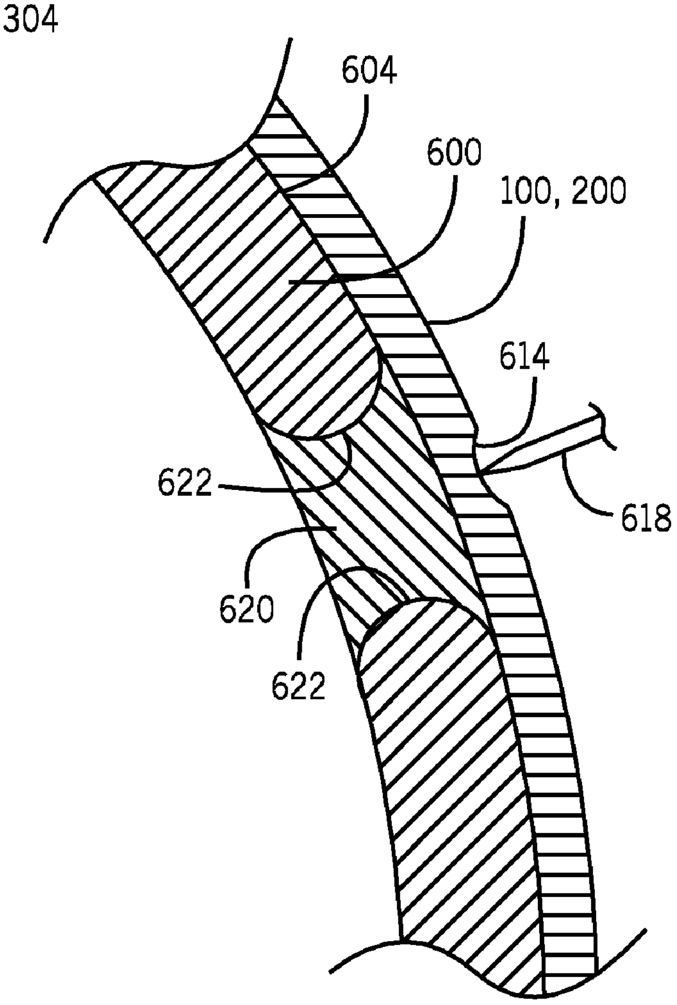
FIG. 7

PROTECTIVE AND DECORATIVE COVERING FOR SPORTS HELMETS

BACKGROUND OF THE INVENTION

1. Field of the Invention

The present invention relates generally to sports helmets, and more particularly, to protective and decorative coverings for sports helmets.

2. Prior Art

Sport helmets are used in various sports from youth leagues to professional leagues. While professional teams can afford to customize their helmets with the team's name, player's name, player's number, team logo, or team colors, youth leagues often cannot. In youth leagues, the helmets, such as those used in football and baseball are generally a solid color (e.g., white for football and navy blue or black for baseball) and are used for all teams without any markings or color to differentiate one team from another.

Furthermore, youths like to decorate their helmets with stickers, paint, and/or markers to personalize the helmet and/or show their accomplishments. However, youth leagues often do not allow such customization because of the expense of the helmets and the need to reuse the helmets for other youths and/or in other seasons.

Still further, because of the expense of the helmets, extreme care must be used to prevent damage, wear and tear, and even cosmetic blemishes to the helmets. Any damage or blemishes to the helmets is magnified due to the solid colors of the helmets, which is often white, particularly in the case of football helmets.

SUMMARY OF THE INVENTION

Therefore it is an object of the present invention to provide decorative and protective coverings for sports helmets that overcome the disadvantages in the art of sports helmets.

Accordingly, a covering for a sports helmet is provided. The covering comprising a band having at least a portion composed of a first heat shrink material, the band being sized to cover the sports helmet after an application of heat to the first heat shrink material.

The band can further comprise an indicia disposed on a surface of the band. The indicia can be representative of a sports team. The indicia can be sized such that it has a predetermined proportion after the application of the heat to the first heat shrink material.

The covering can further comprise at least one edge band disposed on an edge of the band, the edge band being composed of a second heat shrink material, the second heat shrink material can have a different shrink rate than a shrink rate of the first heat shrink material. The shrink rate of the second heat shrink material can be greater than the shrink rate of the first heat shrink material.

The band can have one or more holes, each of the one or more holes corresponding to a hole in the sports helmet after the application of heat to the first heat shrink material. The covering can further comprise at least one hole band disposed on a periphery of at least one of the one or more holes, the hole band being composed of a second heat shrink material, the second heat shrink material having a different shrink rate than a shrink rate of the first heat shrink material. The shrink rate of the second heat shrink material can be greater than the shrink rate of the first heat shrink material.

The covering can further comprise one or more markers for aligning the cover with corresponding markers on the helmet.

Also provided is a covering for a sports helmet. The covering comprising a band of first heat shrink material which when shrunk by an application of heat surrounds at least a portion of an outer surface of the sports helmet.

The band can further comprise an indicia disposed on a surface of the band. The indicia can be representative of a sports team. The indicia can be sized such that it has a predetermined proportion after the application of the heat to the first heat shrink material. The covering can further comprise at least one edge band disposed on an edge of the band, the edge band being composed of a second heat shrink material, the second heat shrink material can have a different shrink rate than a shrink rate of the first heat shrink material. The shrink rate of the second heat shrink material can be greater than the shrink rate of the first heat shrink material.

The band can have one or more holes, each of the one or more holes corresponding to a hole in the sports helmet after the application of heat to the first heat shrink material. The covering can further comprise at least one hole band disposed on a periphery of at least one of the one or more holes, the hole band being composed of a second heat shrink material, the second heat shrink material having a different shrink rate than a shrink rate of the first heat shrink material. The shrink rate of the second heat shrink material can be greater than the shrink rate of the first heat shrink material.

The covering can further comprise one or more markers for aligning the cover with corresponding markers on the helmet.

Also provided is a covering for a sports helmet. The covering comprising a material composed at least partially of a heat shrink material and sized to surround at least a portion of an outer surface of the sports helmet after an application of heat to the heat shrink material.

Still provided is a sports helmet comprising: a shell having an outer surface; and a covering comprising a material composed at least partially of a heat shrink material for at least one of protecting and decorating the shell.

Still yet further provided is a sports helmet comprising: a shell having an outer surface; and means for one of aligning, applying and removing a covering from the outer surface.

The means can further comprise at least one marker for aligning the covering on the outer surface. Each of the at least one marker can comprise a dimple projecting from the outer surface.

The sports helmet can further comprise a peripheral groove formed in the outer surface in which is disposed an edge of the covering.

The means can comprise a cutting groove formed in the outer surface for facilitating removal of the covering from the outer surface.

The means can comprise one or more removable button snaps. The one or more removable button snaps can each comprise a female and male portion, the female portion having an internal female thread and the male portion having an external thread for matingly engaging the internal female thread.

Still yet provided is a sports helmet comprising: a shell having an outer surface; and one or more of the following: at least one marker for aligning a covering on the outer surface; a peripheral groove formed in the outer surface in which is disposed an edge of the covering; a cutting groove formed in the outer surface for facilitating removal of the covering from the outer surface; and one or more removable button snaps.

BRIEF DESCRIPTION OF THE DRAWINGS

These and other features, aspects, and advantages of the apparatus and methods of the present invention will become better understood with regard to the following description, appended claims, and accompanying drawings where:

FIG. 6*a* illustrates an enlarged view of a portion of the helmet of FIG. 6.

FIG. 7 illustrates a top sectional view of yet another alternative football helmet.

DETAILED DESCRIPTION OF THE PREFERRED EMBODIMENT

Although this invention is applicable to numerous and various types of sports helmets, it has been found particularly useful in the environment of baseball and football sports helmets. Therefore, without limiting the applicability of the invention to baseball and football sports helmets, the invention will be described in such environment. Those skilled in the art will appreciate that the decorative and protective coverings of the present invention have utility in other types of sports helmets, such as hockey helmets and helmets for other sports activities that require a protective head covering, such as skateboarding, skiing, and bicycling.

Figure 1:
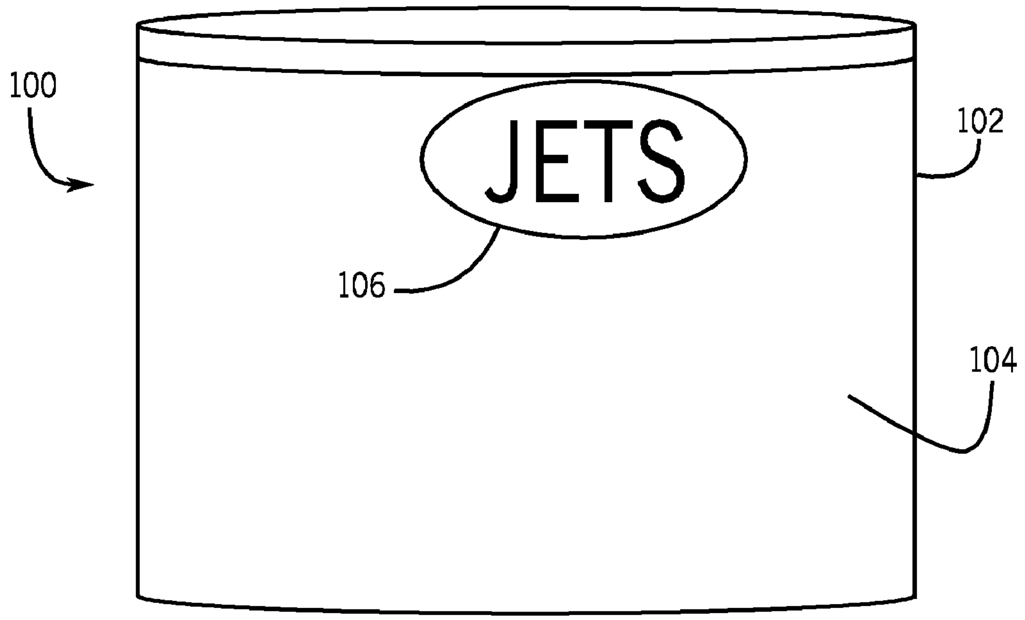
FIG. 1 illustrates an embodiment of a covering for a sports helmet.
Figure 2:
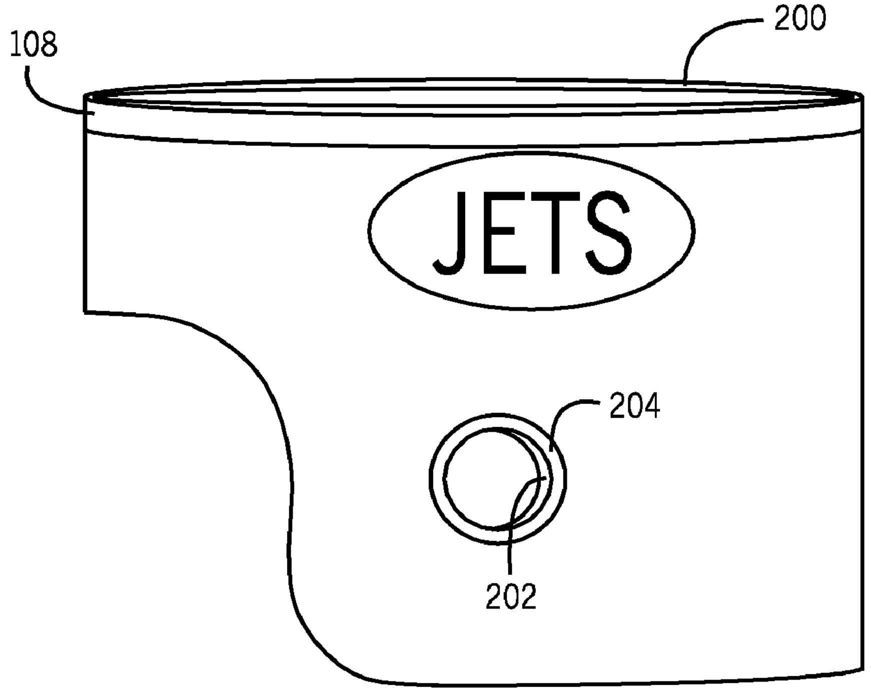
FIG. 2 illustrates an embodiment of a covering for a sports helmet.

Referring now to FIG. 1, there is illustrated a covering for a sports helmet, generally referred to by reference numeral 100. The covering 100 comprises a band 102 having at least a portion composed of a heat shrink material 104. The heat shrink material can be a thin film. The entire band 102 can be composed of a heat shrink material 104 or only a portion thereof. Furthermore, two or more heat shrink materials 104, each having the same or different heat shrink characteristics, can be used to construct the band 102. Heat shrink characteristics are characteristics of the heat shrink material 104, such as type of material, degree of transparency of the material, film thickness, and shrink rate of the material. Although, the covering 100 is shown in FIG. 1 as a band 102 of uniform height H, the same can vary in size, "band" being used generally herein to refer to any closed form. Although it is preferred that the band 102 be seamless, a seam (not shown) can be used to provide the closed form. As will be discussed below, the band 102 is sized to cover a sports helmet after an application of heat to the heat shrink material 104. The covering 100 can be sized and shaped such that it may require trimming after being shrunk onto the helmet, as shown in FIG. 1. The covering 200 can be pre-trimmed to fit a particular helmet shape and size as shown in FIG. 2. The covering 200 can also be provided with openings 202 to correspond with openings in the sports helmet for which it covers.

Heat shrink materials are well known in the art and therefore only a brief description thereof is set forth herein. There are four major types of heat shrink materials, PVC, polyolefin, polypropylene, and polyethylene. The shrink properties of the materials vary with the materials and is set at the point of manufacturing. PVC heat shrink film material has a high clarity, has a relatively low cost, and requires relatively low heat to shrink the film. Generally a heat gun can be used and in some instances a hair dryer is sufficient. PVC heat shrink film material also lends itself to treatment for printing. The shrink rate for PVC heat shrink film material can range from 10 to 40% in each of two directions (length and width) and is commercially available in many thicknesses, such as 50, 60, 75, and 150 gauge. A heat shrink material having an inner or outer layer of woven material may also be used. Such materials are also well known in the art.

The covering 100 is generally used to cover a sports helmet to add an indicia to the sports helmet and/or to add a protective layer to the outside surface of the helmet. As shown in FIG. 1, the indicia 106 can be disposed on a surface of the band 102, such as by printing it there upon. The indicia can be sized such that it has a predetermined proportion after the application of the heat to the heat shrink material 104. Further, the indicia can be placed between the covering 100 and the outer surface of the helmet and captured therein when the covering is shrunk in place. The indicia can take on any form, such as being representative of a sports team, a player's name or uniform number, an organization, a club and/or an individual.

The covering 100 can further have at least one edge band 108 disposed on an edge of the band 102. The edge band 108 can be composed of a second heat shrink material. The second heat shrink material can have a different shrink rate than a shrink rate of the first heat shrink material. For example, since a helmet is generally curved more at the top than on the sides, the top of the band 102 may need to shrink more than the sides. Therefore, the edge band 108 can have a greater shrink rate (e.g., 40%) than the shrink rate of the remaining band (e.g., 15%). Thus, the shrink rate of the second heat shrink material can be greater than the shrink rate of the first heat shrink material 104. Similarly, the band 102 can have one or more holes 202 as shown in FIG. 2 where each of the holes correspond to a hole in the sports helmet after the application of heat to the first heat shrink material. In such a configuration, the covering can further have a hole band 204 disposed on a periphery of the hole 202. As discussed above with regard to the edge band 108, the hole band can be composed of a second heat shrink material where the second heat shrink material can have a different shrink rate than a shrink rate of the first heat shrink material 104. Again, because it may be desired for the covering to shrink more around the hole 202, the shrink rate of the second heat shrink material can be greater than the shrink rate of the first heat shrink material 104. The edge and hole bands 108, 204 may be affixed to the first heat shrink material 104 by any means known in the art, such as heat sealing and adhesive gluing. The edge and hole bands 108, 204 may also be disposed in a pocket formed in the first heat shrink material 104, the pocket may be open for insertion of the edge or hole bands 108, 204 or the pocket may be permanently closed to seal the edge or hole 108, 204 bands therein.

Figure 3:
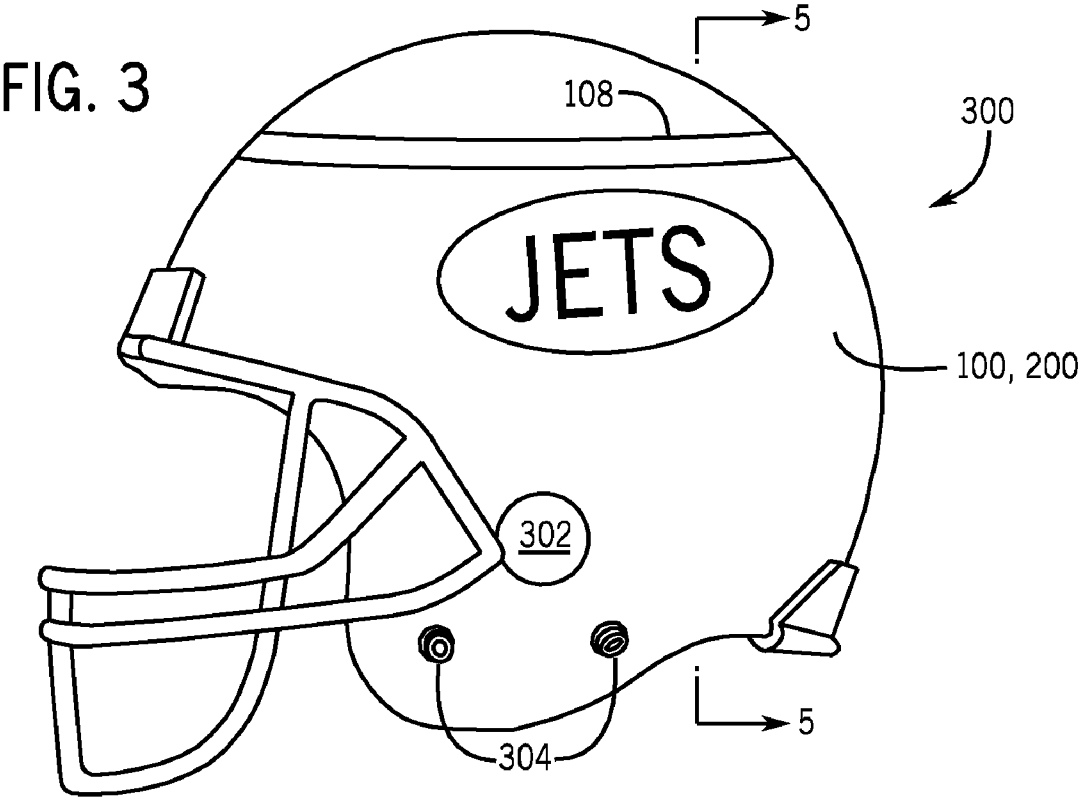
FIG. 3 illustrates the coverings of FIG. 1 or FIG. 2 on a football sports helmet.
Figure 4:
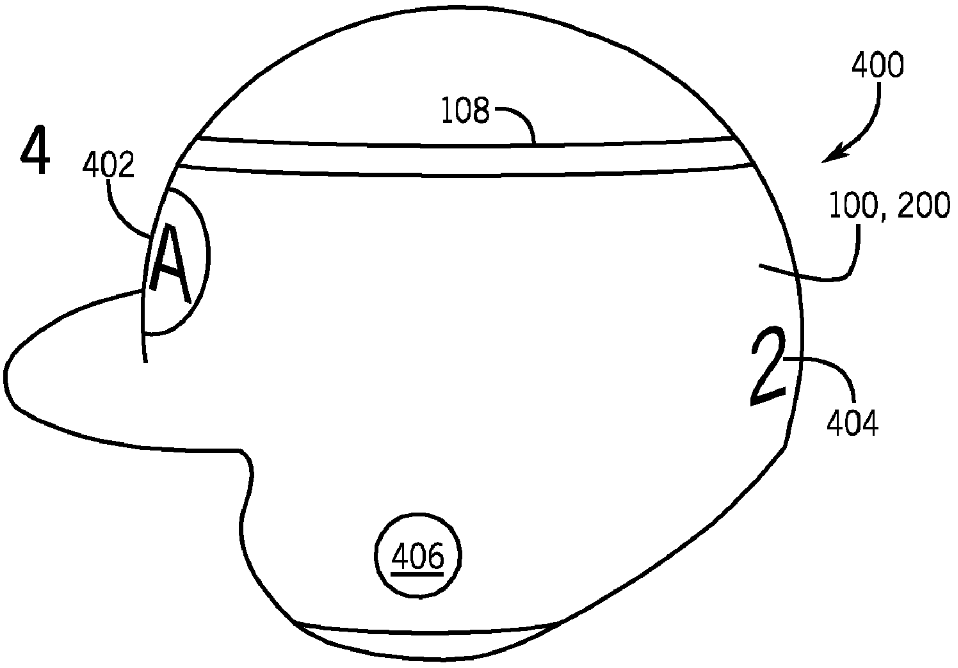
FIG. 4 illustrates a covering on a baseball helmet.
Figure 5:
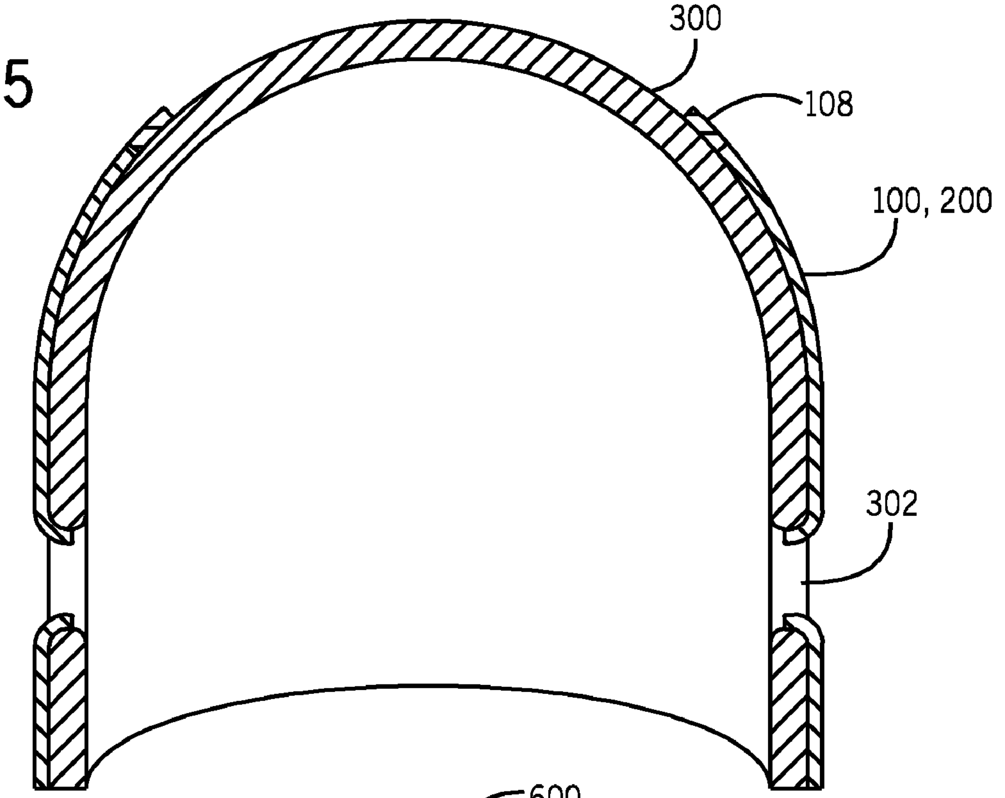
FIG. 5 illustrates a sectional view of the football helmet of FIG. 3 as taken along line 5-5 in FIG. 3.

Referring now to FIGS. 3 and 4 there are shown football and baseball helmets, respectfully, the football helmet being referred to generally by reference numeral 300 and the baseball helmet being referred to generally by reference numeral 400. FIG. 5 illustrates a sectional view of the football helmet 300 of FIG. 3 as taken along line 5-5 in FIG. 3. However, FIG. 5 may also illustrate a sectional of the baseball helmet 400 of FIG. 4. The helmets of FIGS. 3 and 4 are shown with the covering 100, 200 disposed thereon after the application of heat to shrink the covering 100, 200 in place on the helmets 300, 400. The football helmet 300 is shown with indicia 106 of a professional football team (e.g., NY Jets®) on a side surface of the helmet while the baseball helmet 400 is shown with the indicia 402 of a professional baseball team (NY Mets®) on a front surface thereof. Indicia of other teams, clubs, organizations, or individuals can also be disposed on the covering 100, 200. The baseball helmet further has indicia representing a uniform number 404 on a back surface of the helmet 400. As discussed above, the coverings 100, 200 can be trimmed after shrinking or custom sized such that no or minimal trimming is necessary after shrinking onto the helmet 300, 400. Furthermore, the covering 100, 200 can be supplied with one or more holes 202 corresponding to holes 302, 406 of the helmet or such holes can be trimmed after shrinking. If trimmed after shrinking, heat can be reapplied to the edges of the hole 202 to further shrink the edges into the hole 302, 406 of the helmet as is shown in FIG. 5. The hole 202 can also have a hole band 204 as discussed above, which if having a greater shrink rate than that of the covering, would also recess the covering into the hole 302, 406 as shown in FIG. 5. As also discussed above, the covering 100, 200 may have an edge band 108 for facilitating the covering to conform to the curved top surface of the helmet 300, 400, as shown in FIG. 5. The helmet, particularly the football helmet 300 may have buttons button snaps 304, such as for securing a mouthpiece, the covering 100, 200 may have precut holes for such button snaps or the covering 100, 200 may be trimmed around such button snaps 304 after shrinking. The button snaps 304 can also be removable such that they can be removed prior to application of the covering 100, 200 and shrinking of the same. The covering 100, 200 can then be trimmed around the holes for the removed button snaps and the button snaps can then be replaced on the helmet 300. The removable button snaps 304 (see FIGS. 6 and 6*a*) can be made of a female and male part 310, 312 with the female part 310 having a female thread and the male part 312 having a mating male thread. The removable buttons can be removable by any other means known in the art such as a press or interference fit.

Figure 6:
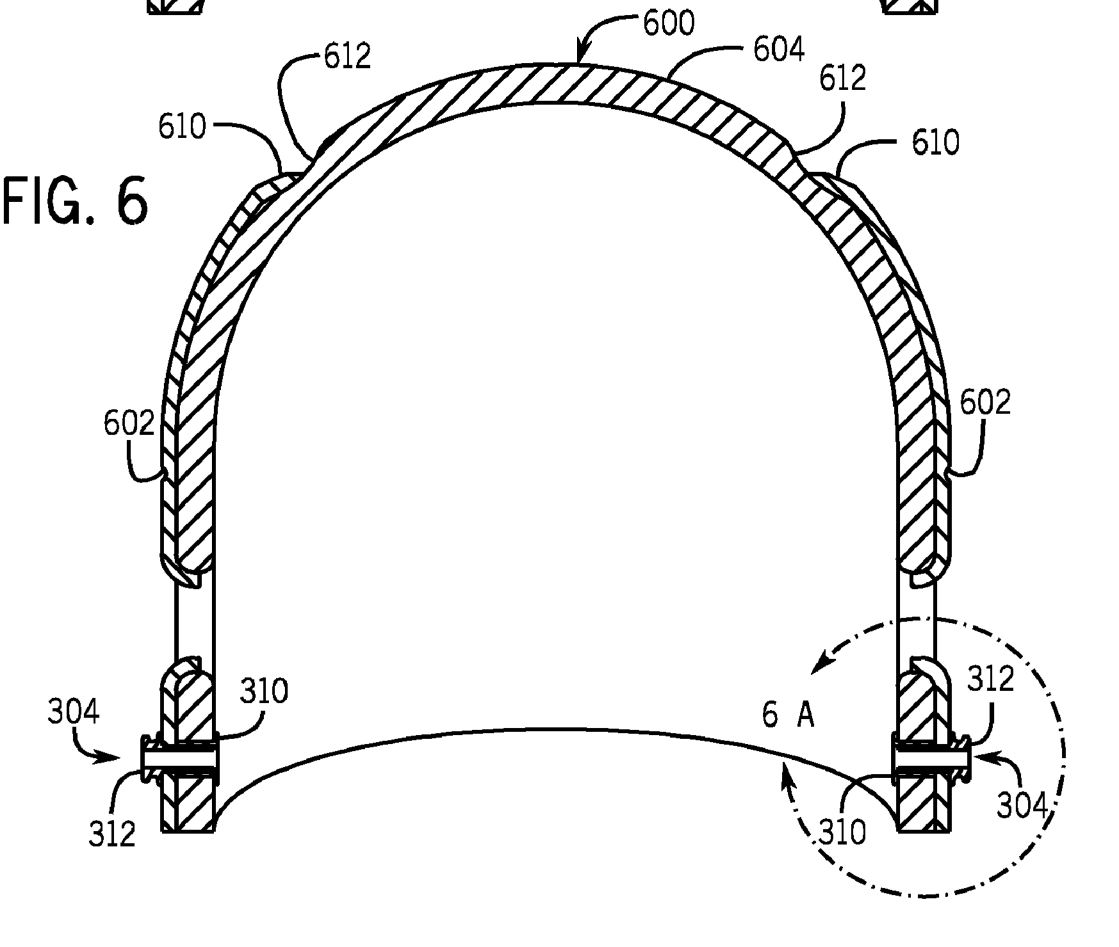
FIG. 6 illustrates a side sectional view of an alternative football helmet.
Figure 8:
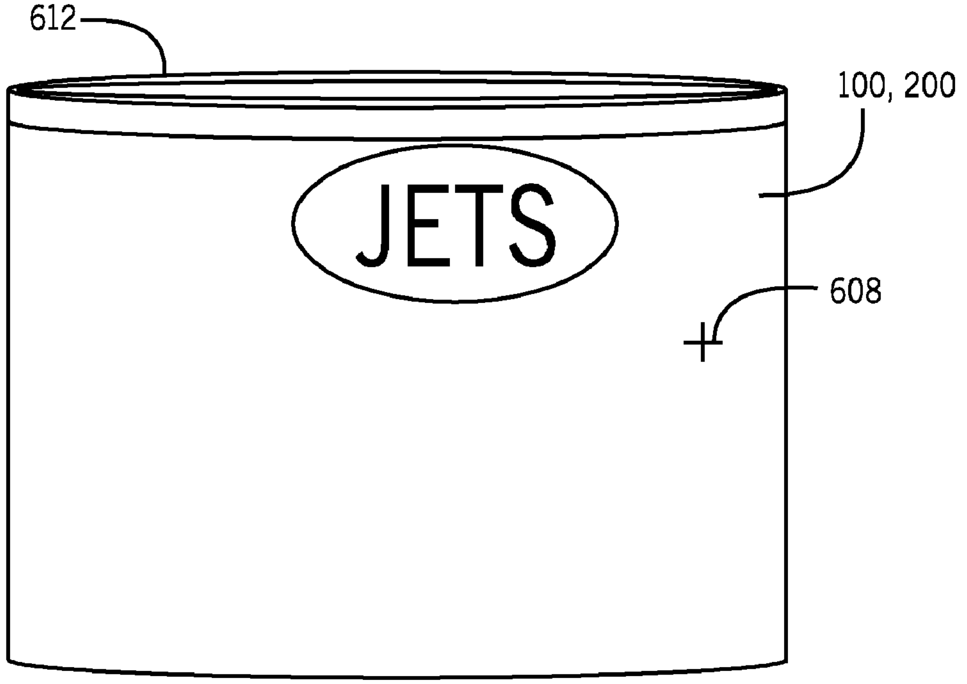
FIG. 8 illustrates an embodiment of a covering for a sports helmet.
Figure 9:
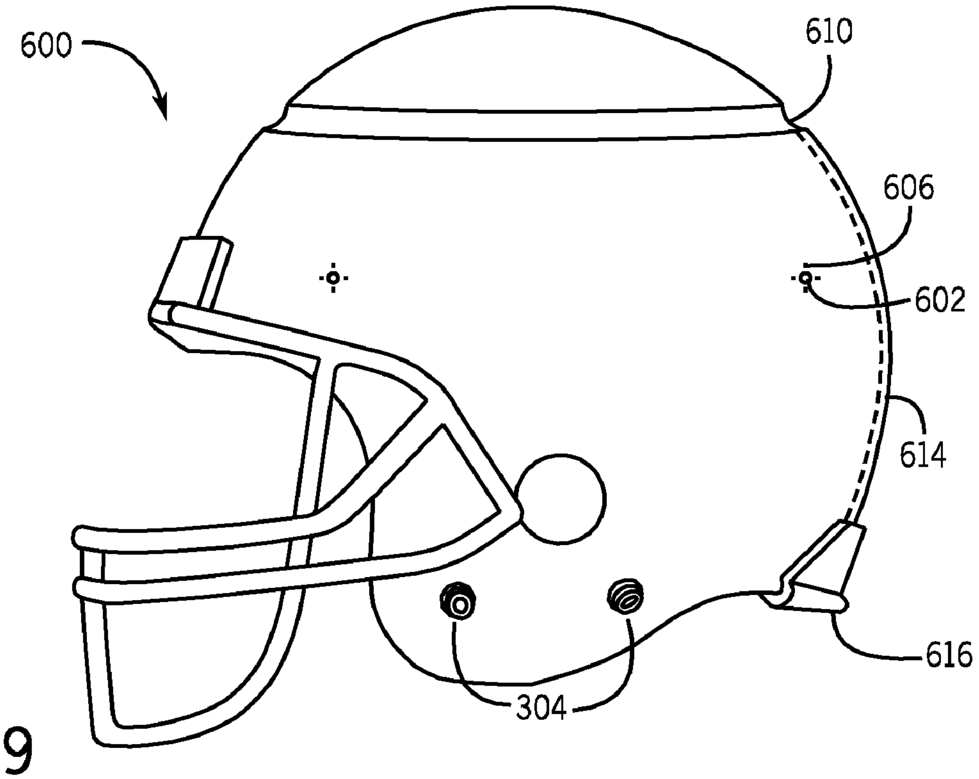
FIG. 9 illustrates a sports helmet having the covering of FIG. 8 and the features of the helmets of FIGS. 6 and 7.

Referring now to FIGS. 6 and 7, the same illustrate side and top sectional views, respectively of a sports helmet 600, in which like features are referred to with like reference numerals discussed above with regard to sports helmets 300 and 400. The sports helmet 600 can have removable button snaps 304 as discussed above to facilitate trimming of the covering 100, 200 on the helmet 600. The sports helmet 600 can also have at least one marker for facilitating the alignment of the covering 100, 200 on an outer surface 604 of the sports helmet. Preferably at least two to four such markers are used on the helmet 600. Each of the markers can comprise a dimple 602 projecting from or recessed in the outer surface 602. The dimple 602 can be formed integrally with the outer surface 604 of the sports helmet 600 or applied to the outer surface 604 (e.g., with adhesive) or fixed to the outer surface 604 (e.g., inserted into a corresponding hole in the outer surface 604 of the helmet 600). As shown in FIG. 9, the markers can also comprise a crosshairs or other indicia 606. The crosshairs 606 can be integrally formed on the outer surface 604 such as in the form of a ridge or indentation or they can be applied or printed on the outer surface 604. The markers can be either the dimple 602 or the indicia 606 or both. The markers are useful to facilitate alignment of the covering 100, 200 with the helmet 600. This is particularly important where the covering 100, 200 has an indicia that should be oriented in a particular manner or holes which should align with corresponding holes on the sports helmet 600. As shown in FIG. 8, the covering 100, 200 can also have alignment markers 608 corresponding to the alignment markers 606 of the helmet 600. The alignment markers on both the helmet 600 and sports covering 100, 200 are preferably located at position(s) where minimal shrinking is necessary, such as at a widest portion of the sports helmet 600 as is shown in FIG. 6. Furthermore, the covering 100, 200 can be sized such that it fits snugly around the widest portion of the helmet 600 before shrinking such that the markers 606 of the helmet 600 and the corresponding markers 608 of the covering 100, 200 can be easily aligned and held in position before shrinking of the covering 100, 200.

The sports helmet 600 can also have a peripheral groove 610 which, although shown in cross-section in FIG. 6, is preferably formed along an entire or substantial portion of the periphery of the helmet 600 as shown in FIG. 9. The peripheral groove 610 can be an indentation formed in the outer surface 604 of the sports helmet 600. The peripheral groove 610 can also be raised above the surface of the outer surface 604 of the helmet 600. As shown in FIG. 6, where the peripheral groove 610 is an indentation, it is useful for containing an edge 612 of the covering 100, 200 after shrinking. Thus, the edge 612 of the covering 100, 200 can be completely disposed below the outer surface 604 without any of the edge sticking up which may be susceptible to tearing or causing injury. Where the peripheral groove 610 is raised, the edge 612 can be shrunk against it to also prevent the edge from tearing or causing injury.

The sports helmet 600 may further comprise a cutting groove 614 formed in the outer surface 604 of the sports helmet 600 for facilitating removal of the covering 100, 200 from the outer surface 604. The cutting groove 614 is shown in FIGS. 7 and 9 disposed along a back of the sports helmet 600 but may be positioned anywhere on the outer surface 604 of the helmet 600. The cutting groove 614 is also shown in FIG. 9 as traversing a substantial portion of the back of the helmet 600 from a lower edge 616 to the peripheral groove 610. However, the cutting groove may traverse a portion of the shown length. Since the covering may be changed each season to reflect an individual's new team, uniform number or for any other reason, as shown in FIG. 7, a cutting tool 618, such as a straight edge razor, can be run along the cutting groove 614 to easily remove the covering 100, 200. The cutting groove 614 also serves to reduce the likelihood that the cutting tool 618 will damage the outer covering 604 of the sports helmet 600. Furthermore, a portion of the helmet surrounding the cutting groove 614 can be an insert 620 which may be made from a different material that is more resistant to being damaged by the cutting tool 618, such as a very hard thermoplastic, graphite, or metal. The insert may alternatively be a softer sacrificial material such as polypropylene. The insert 620 can be permanently fixed to the outer surface 604 of the helmet 600 or may be a replaceable insert that is fixed by a press fit, adhesive, or fasteners such as screws. For example, as shown in FIG. 7, the insert 620 may have a concavity 622 for facilitating a "snap" fit with an edge of the helmet's shell surrounding the insert 620.

Although, the covering is shown and described as having written indicia printed thereon, the covering may also be blank (including one or more solid colors, patterns, and designs) and written indicia (including a logo) may be applied with a label or the like. Furthermore, the band may be supplied in a closed sheet with tear-off portions on the edges such that it can be fed through a printer for printing indicia thereon. After printing, the tear-off portions can be removed from the edges to provide an open band. Of course, the heat-shrinkable material of the band (or portion thereof) must not shrink from the heat of the printer. In other words, the heat of the printer must be less then the temperature that causes the band to shrink.

Those skilled in the art will appreciate that the coverings and sports helmets of the present invention, overcome many disadvantages with sports helmets of the prior art while maintaining a relatively low expense, such as:

(a) affording individuals, teams, clubs, and other organizations an opportunity to customize their helmets with the team's name, player's name, player's number, team logo, or team colors; this is especially true in youth leagues but applies to any organization or individual;

(b) allowing individual players to decorate their helmets with stickers, paint, and/or markers to personalize the helmet and/or show their accomplishments (and may be packaged together with such stickers); and (c) providing an extra degree of protection to prevent damage, wear and tear, and cosmetic blemishes to the helmets.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. A covering for a sports helmet, the covering comprising a band having at least a portion composed of a first heat shrink material, the band being sized to cover the sports helmet after an application of heat to the first heat shrink material and at least one edge band disposed on an edge of the band, the edge band being composed of a second heat shrink material, the second heat shrink material having a different shrink rate than a shrink rate of the first heat shrink material.

2. The covering of claim 1, wherein the band further comprises an indicia disposed on a surface of the band.

3. The covering of claim 2, wherein the indicia is representative of a sports team.

4. The covering of claim 2, wherein the indicia is sized such that it has a predetermined proportion after the application of the heat to the first heat shrink material.

5. The covering of claim 1, wherein the shrink rate of the second heat shrink material is greater than the shrink rate of the first heat shrink material.

6. A covering for a sports helmet, the covering comprising a band having at least a portion composed of a first heat shrink material, the band being sized to cover the sports helmet after an application of heat to the first heat shrink material, wherein the band having one or more holes, each of the one or more holes corresponding to a hole in the sports helmet after the application of heat to the first heat shrink material.

7. The covering of claim 6, further comprising at least one hole band disposed on a periphery of at least one of the one or more holes, the hole band being composed of a second heat shrink material, the second heat shrink material having a different shrink rate than a shrink rate of the first heat shrink material.

8. The covering of claim 7, wherein the shrink rate of the second heat shrink material is greater than the shrink rate of the first heat shrink material.

9. A covering for a sports helmet, the covering comprising a band having at least a portion composed of a first heat shrink material, the band being sized to cover the sports helmet after an application of heat to the first heat shrink material, and one or more markers for aligning the cover with corresponding markers on the helmet.

10. A covering for a sports helmet, the covering comprising a band of first heat shrink material which when shrunk by an application of heat surrounds at least a portion of an outer surface of the sports helmet, wherein the band having one or more holes, each of the one or more holes corresponding to a hole in the sports helmet after the application of heat to the first heat shrink material.

11. The covering of claim 10, wherein the band further comprises an indicia disposed on a surface of the band.

12. The covering of claim 11, wherein the indicia is representative of a sports team.

13. The covering of claim 12, wherein the indicia is sized such that it has a predetermined proportion after the application of the heat to the first heat shrink material.

14. The covering of claim 10, further comprising at least one hole band disposed on a periphery of at least one of the one or more holes, the hole band being composed of a second heat shrink material, the second heat shrink material having a different shrink rate than a shrink rate of the first heat shrink material.

15. The covering of claim 14, wherein the shrink rate of the second heat shrink material is greater than the shrink rate of the first heat shrink material.

16. A covering for a sports helmet, the covering comprising a band of first heat shrink material which when shrunk by an application of heat surrounds at least a portion of an outer surface of the sports helmet and at least one edge band disposed on an edge of the band, the edge band being composed of a second heat shrink material, the second heat shrink material having a different shrink rate than a shrink rate of the first heat shrink material.

17. The covering of claim 16, wherein the shrink rate of the second heat shrink material is greater than the shrink rate of the first heat shrink material.

18. A covering for a sports helmet, the covering comprising a band of first heat shrink material which when shrunk by an application of heat surrounds at least a portion of an outer surface of the sports helmet and one or more markers for aligning the cover with corresponding markers on the helmet.

19. A sports helmet comprising:

a shell having an outer surface; and one or more of the following:

- at least one marker for aligning a covering on the outer surface;
- a peripheral groove formed in the outer surface in which is disposed an edge of the covering;
- a cutting groove formed in the outer surface for facilitating removal of the covering from the outer surface; and
- one or more removable button snaps.

* * * * *